May 18, 1926.  
J. LA CHANCE  
1,585,502  
MACHINE FOR CLARIFYING SMOKE AND RECOVERING DEPOSITS THEREFROM  
Filed July 5, 1923
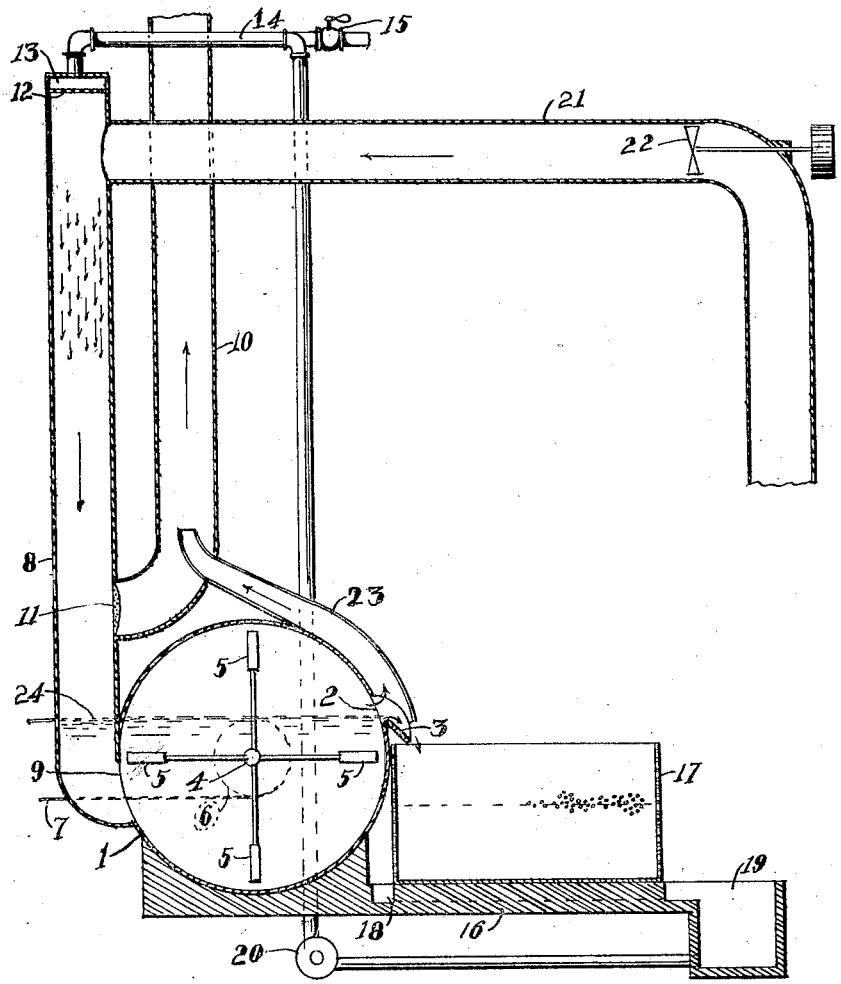
INVENTOR  
Joseph La Chance  
BY John A. Graismith  
ATTORNEY Patented May 18, 1926.

1,585,502

UNITED STATES PATENT OFFICE.

JOSEPH LA CHANCE, OF MORGAN HILL, CALIFORNIA.

MACHINE FOR CLARIFYING SMOKE AND RECOVERING DEPOSITS THEREFROM.

Application filed July 5, 1923. Serial No. 649,617.

It is one object of my invention to provide a device that will quickly and thoroughly precipitate the carbon and other like substances discharged from furnaces in the form of smoke.

It is another object of my invention to provide means for separating the precipitated matter from the medium by which it is precipitated whereby the said medium may be used over again or discharged without harm into any sewer, and the precipitated matter easily removed and disposed of.

The drawing is a vertical sectional view through one embodiment of the invention.

Referring more particularly to the drawing, I show at 1 a fixed drum having a longitudinal slot formed therein at 2, the said slot being provided with a lip 3. Mounted on a shaft 4 axially arranged to revolve in drum 1 are a number of paddles 5, the shaft and paddles being somewhat slowly rotated in any suitable manner as by a pulley 6 and a belt 7 operated by a motive power not shown.

At 8 is a vertically arranged tower mounted on and communicating with drum 1 at 9, a vent therefor being provided at 10 and fitted with a fine screen 11. In the top of tower 8 is positioned a preforated plate 12 thereby forming a compartment 13 supplied with water from a supply pipe 14 controlled by a valve 15.

At 16 is shown a base supporting a perforated receptacle 17 and having a trough formed therein as at 18 surrounding the receptacle thereon. The receptacle 17 is so proportioned as to slide under lip 3 and catch the overflow from the drum 1. In the present case the trough 18 discharges into a reservoir 19 to which is connected pipe 14, the pipe 14 having a pump inserted therein as indicated in a conventional manner at 20.

At 21 is shown a pipe communicating with tower 8 near its upper end and below the plate 12, this pipe having a forced draft fan arranged therein as indicated in a conventional manner at 22. Pipe 21 is the smoke discharge outlet from a source of fuel combustion not shown.

In operation the smoke is discharged into the upper end of the tower from pipe 21. During its passage down the tower to the pipe 10 discharging into the atmosphere the smoke is thoroughly washed by a continuous spray of water through the perforated plate 12, the water keeping the perforated plate 11 clean and discharging into the drum 1 with whatever impurities it may have collected during its passage through tower 8.

Since the paddles 5 are being slowly rotated in drum 1 the matter falling therein is thoroughly disintegrated and diffused throughout the body of water in the drum. When the device is in operation there is a continuous overflow of the semi-liquid mass from the drum into receptacle 17. Since the receptacle 17 is provided with perforated or foraminous walls the water quickly drains away and leaves the solids behind, the receptacle being removed when filled and replaced with an empty one.

The water drained away from receptacle 17 is clear and is conducted by trough 18 to reservoir 19 and thence pumped back into the upper end of tower 8 to be used again.

In this manner the gases discharged from a furnace through pipe 10 are thoroughly cleaned of all carbon and other foreign matter, and the cleaning medium is recovered in such a purified state that it can be used again and again. Also carbon and other comminuted substances extracted from the smoke are recovered in such a condition as to render them easily disposed of.

In order to confine the travel of the smoke to its proper outlet the tower 8 discharges into drum 1 below the horizontal plane of discharge from said drum through slot 2 as shown. Since there will be some concentration of more or less noxious gases in the drum 1, freed from the mass in the drum by continual agitation thereof, a hood is arranged as at 23 over the slot 2 and communicating with the vent 10 whereby the said gases will be carried off through vent 10 instead of being discharged into the atmosphere immediately surrounding drum 1.

It is to be understood of course, that while I have herein shown and described one specific embodiment of my invention, changes in form, construction, and method of operation may be made within the scope of the appended claims.

I claim:

1. In combination, a wash-water collecting drum, a wash-water feeding tower communicating therewith, an agitator operatively mounted in the drum, a settling tank arranged to receive the discharge from said drum, means for permitting the passage of water from said tank, and means for conveying water recovered from said tank to said tower.

2. In combination, a wash-water collecting drum, a wash-water feeding tower communication therewith, a vent communicating with said tower, and a hood communicating with said drum and discharging into said vent.

3. In combination, a wash-water tower, a vent communicating therewith, a drum arranged to receive the wash water therefrom and having a discharge outlet therein, a hood arranged over said outlet and communicating with said vent, a tank arranged to receive the discharge from said drum, and means for retaining solid matter in the tank and permitting the passage of water therefrom.

4. In combination, a washing tower, a wash water receiving drum communicating therewith and having a discharge outlet therein arranged at a level above its communication with said washing tower, a tank arranged to receive the discharge from said drum, and means for retaining solid matter in the tank and permitting the passage of water therefrom.

5. In combination, a washing tower, a vent communicating therewith, a drum arranged to receive the wash water from said tower, means for conducting the gases collecting in said drum to said vent, means for separating the water from the solid matter collected thereby during its passage through said washing tower, and means for conveying the recovered water back to said washing tower.

JOSEPH LA CHANCE.